(12) United States Patent
Mitama

(10) Patent No.: US 7,031,749 B1
(45) Date of Patent: Apr. 18, 2006

(54) SOFTWARE PORTABLE TELEPHONE

(75) Inventor: Masataka Mitama, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/532,894

(22) Filed: Mar. 22, 2000

(30) Foreign Application Priority Data

Mar. 26, 1999 (JP) ............... 11/083162

(51) Int. Cl.
*H04M 1/00* (2006.01)

(52) U.S. Cl. .......... 455/556.1; 455/95; 455/550.1; 455/129

(58) Field of Classification Search .......... 455/556, 455/553, 557, 558, 552, 575, 95, 349, 76, 455/566, 556.1, 556.2, 575.1, 91, 96, 99, 455/100, 127.4, 130, 140, 403, 414.1, 425
See application file for complete search history.

(56) References Cited

U.S. PATENT DOCUMENTS

| | | | | |
|---|---|---|---|---|
| 4,363,935 A | * | 12/1982 | Toya | 455/570 |
| 4,792,939 A | * | 12/1988 | Hikita et al. | 455/86 |
| 5,465,401 A | * | 11/1995 | Thompson | 455/349 |
| 5,537,436 A | * | 7/1996 | Bottoms et al. | 375/222 |
| 5,570,373 A | * | 10/1996 | Wing | 455/423 |
| 5,719,936 A | * | 2/1998 | Hillenmayer | 379/447 |
| 5,812,951 A | * | 9/1998 | Ganesan et al. | 455/445 |
| 5,815,805 A | * | 9/1998 | Crnkovic et al. | 455/575 |
| 5,852,603 A | * | 12/1998 | Lehtinen et al. | 370/280 |
| 5,854,984 A | * | 12/1998 | Buhrmann et al. | 455/552.1 |
| 5,896,566 A | | 4/1999 | Averbuch et al. | 455/419 |
| 6,292,172 B1 | * | 9/2001 | Makhlouf | 345/157 |
| 6,292,668 B1 | * | 9/2001 | Alanara et al. | 455/466 |
| 6,377,785 B1 | * | 4/2002 | Ogino | 455/552 |
| 6,556,681 B1 | * | 4/2003 | King | 380/270 |

FOREIGN PATENT DOCUMENTS

| | | |
|---|---|---|
| GB | 2 326 309 A | 12/1998 |
| JP | 8-186516 | 7/1996 |
| JP | 11-55147 | 2/1999 |

* cited by examiner

*Primary Examiner*—Edward F. Urban
*Assistant Examiner*—Thuan Nguyen
(74) *Attorney, Agent, or Firm*—McGinn IP Law Group, PLLC

(57) ABSTRACT

Received signal inputted from an antenna 1 is fed via a received signal mixer 2 and an A/D converter 3 to a demodulator 4. The demodulator 4 is operated according to software down-loaded in a software memory 5 from a program memory 6. A demodulator output digital signal is fed to a base-band signal processor 8 for signal processing, and then fed out through a man-machine interface 9 to the outside. On the transmission side, a signal to be transmitted is inputted to a modulator 10 though a route converse to that of the received signal. The modulator output is fed to a D/A converter 11 for conversion to an analog signal, which is in turn fed to a transmission signal mixer 12 for conversion to a carrier frequency, and then fed to a module, which includes a power amplifier 21, a transmission signal filter 22 and an isolator 23, to be transmitted via the antenna 1.

27 Claims, 4 Drawing Sheets

SOFTWARE PORTABLE TELEPHONE

BACKGROUND OF THE INVENTION

The present invention relates to a software portable telephone set and, more particularly, to a software portable telephone set capable of coping with a plurality of different radio systems with the same hardware structure by emitting reconfiguration afresh and also mounting and demounting for each system.

In a software radio unit, signals which are received and to be transmitted are converted in an A/D and D/A converters from analog to digital signal and vice versa, respectively, so that digital signal processing is performed as much as possible in the radio unit. Digital signal processing is performed according to a software program. This means that the content or function of the signal processing can be changed by replacing the software. It is thus possible to readily cope with a plurality of different radio systems with the same hardware structure by changing programs.

However, when it is intended to apply such software radio techniques to portable telephone sets, the following problem is encountered. To be able to cope with a plurality of different systems, wide-band active and passive components are necessary. Usually, the expanding the frequency band coverage of components results in characteristics deterioration.

Particularly, deterioration of the transmission side characteristics due to frequency band coverage increase directly influences the performance of the portable telephone set, and this is a great barrier in the realization of software portable telephone sets.

While the above software radio techniques require wide-band passive and active components to be able to cope with a plurality of different systems. Usually, the characteristics of the active and passive components are deteriorated with frequency band coverage increase. Particularly, it is really difficult to maintain high efficiency of a transmitting power amplifier, which is one of the main function components of the transmitting side part, over a wide frequency band. It is also really difficult to increase, with low loss, the frequency band coverage of transmission signal filters and isolators. Deterioration of characteristics of the transmission side components poses problems in the portable telephone set that allowed time of use is reduced and that the size of the portable telephone set body is increased, thus greatly spoiling the commercial value of the software portable telephone set.

SUMMARY OF THE INVENTION

The present invention has been for solving the above drawback, and it has an object of providing a software portable telephone set, which have resort to reconfigurable circuit techniques to be able to cope with a plurality of different systems while holding the same hardware structure and permit, with a detachable transmitting function, the selection of best performance power amplifier and other components for each system, so that it is suited for frequency band coverage increase.

According to an aspect of the present invention, there is provided a software portable telephone set comprising a detachable transmitting function and transmitting and receiving circuits capable of being reconfigured afresh with software updating, wherein the transmission system is reconfigured afresh in relation to the mounting and demounting of a transmitting function part. According to the above invention, it is possible to provide a transmission part suitable to each system. Further, a wide range bandwidth transmission and reception operations are possible by coping with a plurality of systems with the same hardware construction.

The transmitting function is provided by a detachable module for transmitting a modulator output analog signal. According to this, it is possible to select an optimum module for each system to realize an optimum transmission without degrading the characteristic of the transmission parts.

The transmitting and receiving circuits have a software memory part for executing signal conversion processing, programs transferred from a program memory being set in the software memory part. According to this, it is possible to easily cope with a plurality of systems with the same construction.

The transmitting and receiving circuits include a demodulator, a modulator and wide-band synthesizer which are controlled by a program stored in the software memory part. According to this, it is possible to cope with a plurality of systems with the same construction by controlling the demodulator, modulator and wide-band synthesizer with a program corresponding to each system, with the same construction.

The detachable module includes a power amplifier, a transmission signal filter and an isolator. According to this, it is possible to select an optimum module for each system, thus preventing the degradation of the characteristic of the power amplifier, transmission signal filter and isolator. Further, since the character deterioration is caused the characteristic with low loss can be maintained and the deterioration of the parts is prevented.

The transmitting and receiving circuits have a software memory part for executing signal conversion processing, programs transferred from a program memory being set in the software memory part and a plurality of programs for commanding signal conversion processing are stored in the program memory. According to this, it is possible to can cope with a plurality of systems by storing a plurality of programs and cope with a service in a district corresponding to the movement of portable telephone set.

The transmitting and receiving circuits have a software memory part for executing signal conversion processing, programs transferred from a program memory being set in the software memory part and the software memory provides commands according to a program transferred from the software source memory according to a system switching command. According to this, it is possible to cope with each system by the program command.

According to an aspect of the present invention, there is provided a portable telephone set comprising a transmission function unit and/or a receipt function unit, wherein the transmission function unit for performing a specified transmission process is detachably mounted to a body of the portable telephone set and the operation of the transmission function and/or receipt function is determined on the basis of a predetermined software which is selected.

The predetermined software is selected from a plurality of softwares stored in a memory in the portable telephone set.

The operation of a received signal mixing portion, a demodulating portion and a base band signal processing portion in the receipt function unit is determined on the basis of the predetermined software.

One of a plurality of transmission function units each performing a different frequency band operation is detachably mounted to the body.

The plurality of softwares are stored in a software source memory, one of the plurality of softwares is selected and down-loaded and the operation of the receipt processing unit is defined by the down-loaded software.

The transmission function unit includes an amplifier, a transmission signal filter and an isolator.

The transmission function unit includes a software memory for storing a plurality of softwares each adapted to each transmission function unit, the predetermined software is defied by loading the software from the software memory in the mounted transmission function unit.

Currently operation system is detected on the basis of demodulated output of the received signal in the receipt function unit and the detected system is displayed.

Other objects and features will be clarified from the following description with reference to attached drawings.

PREFERRED EMBODIMENTS OF THE INVENTION

Preferred embodiments of the present invention will now be described with reference to the drawings.

An embodiment of the present invention will now be described with reference to the drawings. The embodiment to be described is merely an example of the software portable telephone set according to the present invention.

Figure 1:
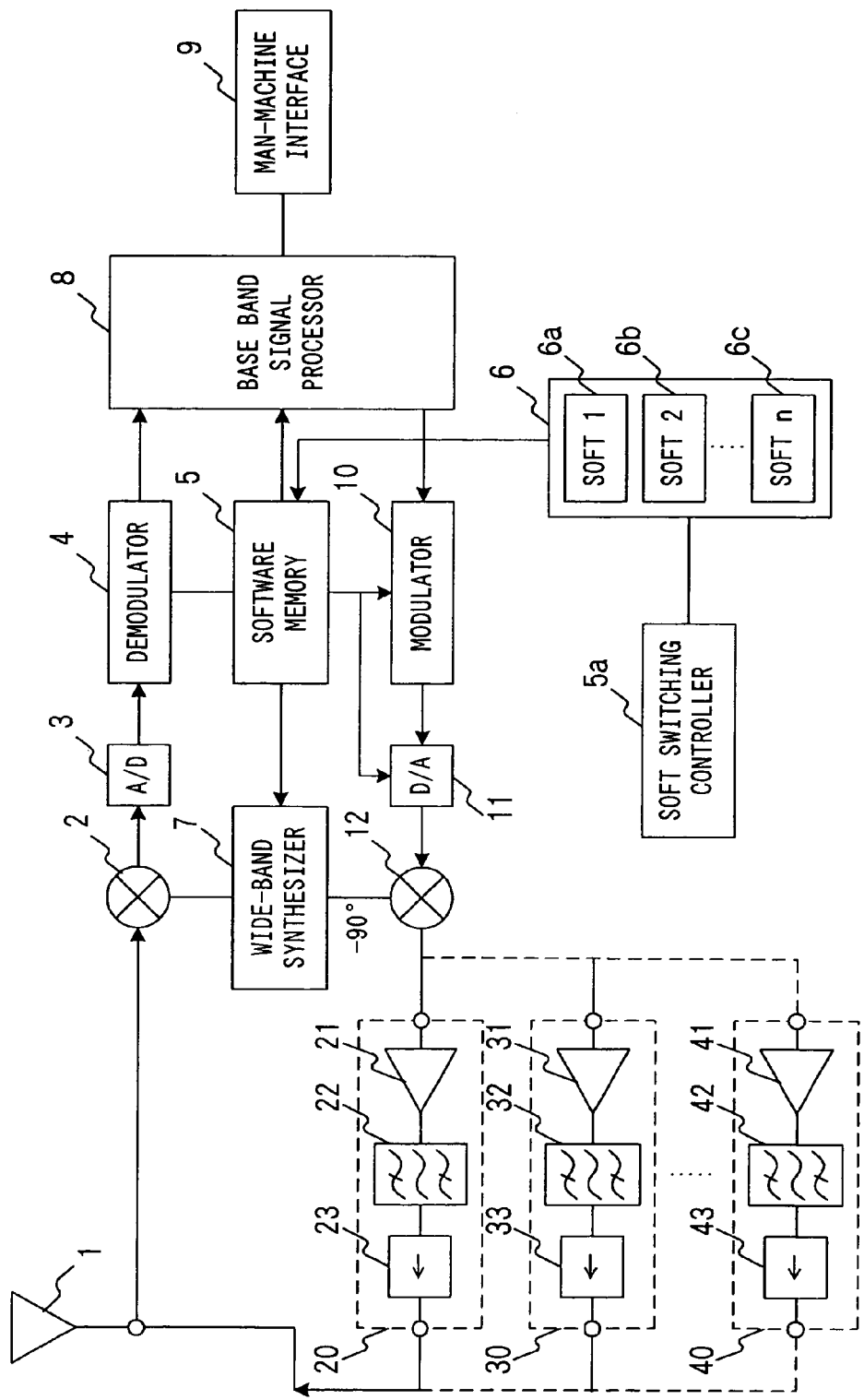
FIG. 1 is a block diagram showing a first embodiment of the present invention.

As shown in FIG. 1, in the software portable telephone set according to the present invention a received signal inputted from an antenna 1 is fed through a received signal mixer 2 and an A/D converter 3 to a demodulator 4. The demodulator 4 is operated according to software down-loaded in a software memory 5. The function of the demodulator 4 can be reconfigured afresh with every software updating.

The down-loaded software is preliminarily stored in a software source memory 6 which is programmed for each system. In other words, a plurality of software entities are stored in the software source memory 6, and one of them is selected and down-loaded in the memory 5 by a software switching controller 5a. The received signal mixer 2 receives a local oscillation signal fed from a wide-band synthesizer 7 with the frequency thereof restricted according to the software. As a result of the demodulation, a digital signal is fed to a baseband signal processor 8 for signal processing, and then fed out through a man-machine interface 9 to the outside. The base-band signal processor 9 can be reconfigured afresh according to the software. On the transmission side, voice or like signal is inputted along a route converse to that of the received signal to a modulator 10. The modulator 10, like the reception side, can be reconfigured afresh for each system according to software.

The modulator output is fed to a D/A converter 11 for conversion to an analog signal. The analog signal is fed to a transmission signal mixer 12 for conversion to a carrier frequency, and then fed to a module 20, which includes a power amplifier 21, a transmission signal filter 22 and an isolator 23, to be sent out via the antenna 1. A plurality of modules (20, 30 and 40) are prepared each for each system such as frequency band and used detachably. Since the modules are detachable, it is possible to select best module components such as power amplifier as for each system. It is thus possible to avoid characteristic deterioration due to frequency band increase.

Figure 2:
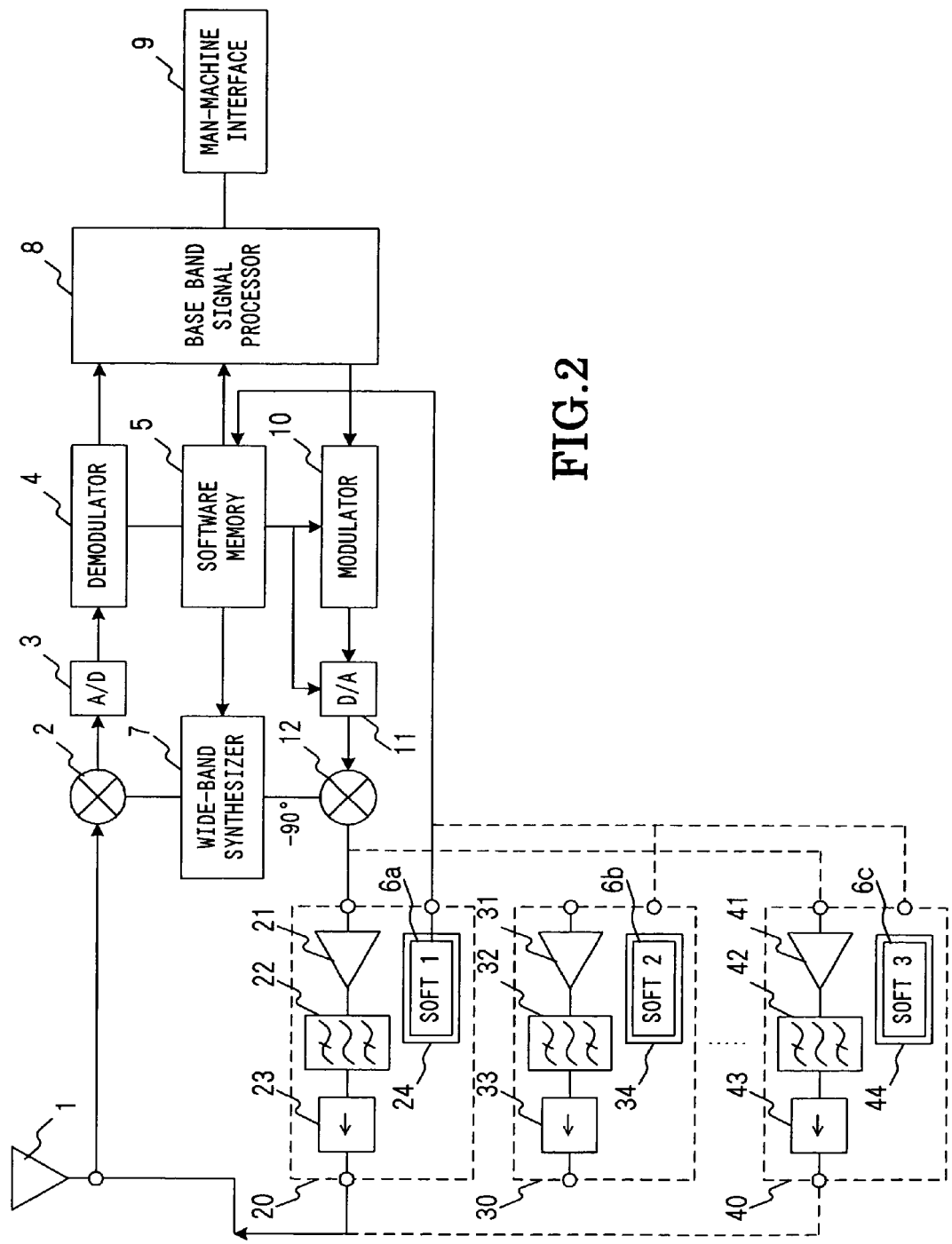
FIG. 2 is a block diagram showing a second embodiment of the present invention.

FIG. 2 is a block diagram showing a second embodiment of the present invention. This embodiment is the same as the previous first embodiment except for that the modules 20, 30 and 40 include respective program memories 24, 34 and 44, in which software for corresponding systems is stored. When a module is mounted, the software thereof is down-loaded in the software memory 5. In this embodiment, the software source memory 6 in the previous first embodiment can be dispensed with, which is desired for reducing the price and size of portable telephone sets.

Figure 3:
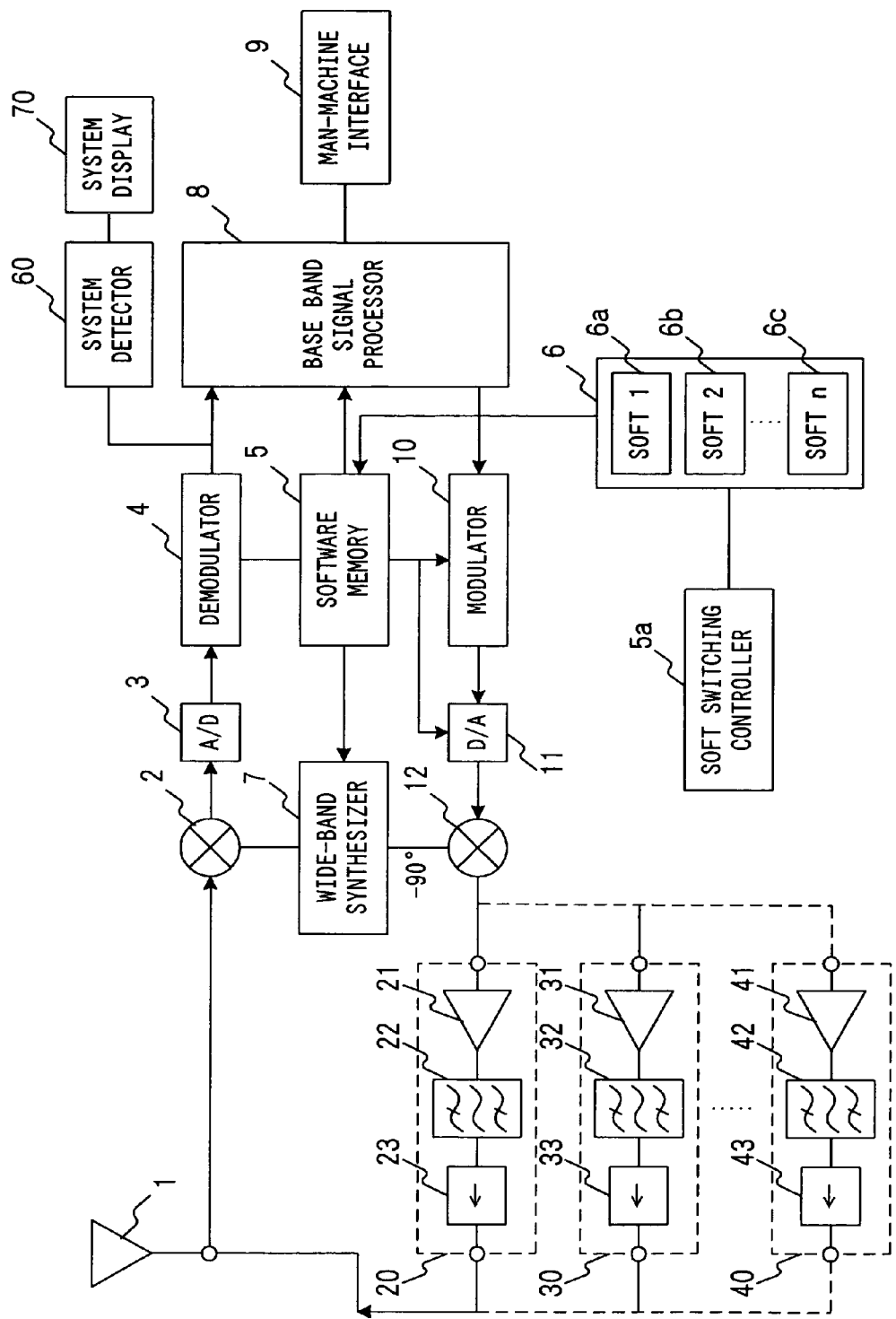
FIG. 3 is a block diagram showing a third embodiment of the present invention.
Figure 4:
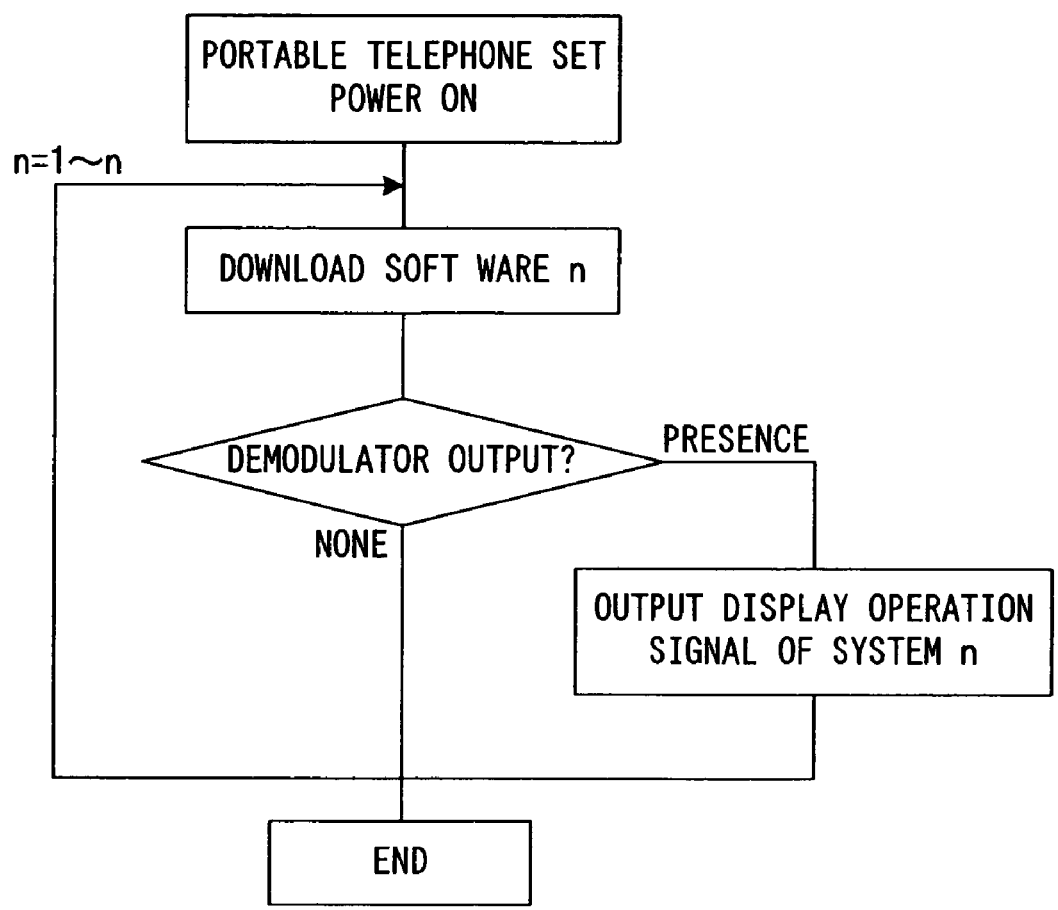
FIG. 4 is a flow chart illustrating the operation of the system detector unit 60.

FIG. 3 is a block diagram showing a third embodiment of the present invention. This embodiment is the same as the previous first embodiment except for that a system detector unit 60 and a system display unit 70 are provided on the transmission side. FIG. 4 is a flow chart illustrating the operation of the system detector unit 60. In FIG. 4, the power of portable telephone set is "on", then a software n (n=1 to n) from a software memory 6 is down-loaded (step S1). Next, the system detector 60 checks whether the output of demodulator exists or not (step S2). When no demodulator output is checked the routine is ended. When the demodulator output exists, a display signal for displaying the system n is generated (step S3) and the routine is ended.

From a display obtained as a result of detection, the user can know systems which can be presently used. Thus, a module complying with the display may be selected and mounted. Thus, even in an unfamiliar land or the like, a system offering services can be known, and communication can be readily set.

As has been described in the foregoing, with the software portable telephone set according to the present invention, it is possible to avoid characteristic deterioration of transmission side components with a detachable transmitting function, and also the transmitting and receiving circuits which are capable of being reconfigured afresh permits coping with a plurality of systems with the same hardware structure. It is thus possible to provide a software portable telephone set, which is suited for frequency band coverage increase.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. A software portable telephone set comprising:
   a detachable transmitting function part; and
   transmitting and receiving circuits capable of being reconfigured afresh with software program updating,
   wherein the transmitting circuit is reconfigured afresh with said program updating in relation to the mounting and demounting of said transmitting function part, and
   wherein said detachable transmitting function part conditions a transmission frequency signal received from said transmitting circuit.

2. The software portable telephone set according to claim 1, wherein said transmitting function part comprises a detachable module for transmitting a modulated output analog signal.

3. The software portable telephone set according to claim 2, wherein the detachable module comprises one of a power amplifier, a transmission signal filter and an isolator.

4. The software portable telephone set according to claim 1, wherein the transmitting and receiving circuits comprise a software memory part for executing signal conversion processing, programs transferred from a program memory being set in the software memory part.

5. The software portable telephone set according to claim 1, wherein the transmitting and receiving circuits comprise one of a demodulator, a modulator and a wide-band synthesizer which are controlled by a program stored in a software memory part.

6. The software portable telephone set according to claim 1, wherein the transmitting and receiving circuits comprise a software memory part for executing signal conversion processing, programs transferred from a program memory being set in the software memory part and a plurality of programs for commanding signal conversion processing being stored in the program memory.

7. The software portable telephone set according to claim 1, wherein the transmitting and receiving circuits comprise a software memory part for executing a signal conversion processing, programs transferred from a program memory being set in the software memory part and the software memory provides commands according to a program transferred from the program memory according to a system switching command.

8. The software portable telephone set of claim 1, wherein said detachable transmitting function part conditions the transmission frequency signal received from said transmitting circuit based upon a transmission system that corresponds to said detachable transmitting function part.

9. The software portable telephone set of claim 1, wherein said transmitting circuit comprises a wide-band transmitting circuit.

10. The software portable telephone set of claim 1, wherein said transmitting circuit comprises a transmission frequency signal synthesizer.

11. The software portable telephone set of claim 10, wherein said transmission frequency signal synthesizer comprises a wide-band synthesizer.

12. The software portable telephone set of claim 1, wherein said transmitting circuit comprises a software memory that is reconfigured afresh in relation to the mounting and demounting of the detachable transmitting function part.

13. The software portable telephone set of claim 12, wherein the software memory is reconfigured afresh in relation to the mounting and demounting of the detachable transmitting function part by replacing a first signal processing program in the software memory with a second signal processing program from a program memory.

14. The software portable telephone set of claim 13, wherein the first signal processing program comprises instructions for performing signal conversion processing.

15. The software portable telephone set of claim 1, further comprising a plurality of detachable transmitting function parts.

16. The software portable telephone set of claim 15, wherein each of said plurality of detachable transmitting function parts performs a different frequency band operation.

17. The software portable telephone set of claim 1, wherein said transmitting circuit that is reconfigured afresh comprises at least one of a demodulator, a wide-band synthesizer, a base-band signal processor, and a modulator.

18. A portable telephone set comprising:
a body;
a transmitting circuit within said body; and
a transmission function unit for performing a specified transmission process being detachably mounted to said body of the portable telephone set,
wherein proper operation of the transmitting circuit occurs on the basis of a selected predetermined software program associated with the transmission function unit, and
wherein said detachable transmitting function unit conditions a transmission frequency signal received from said transmitting circuit.

19. The portable telephone set according to claim 18, wherein the predetermined software program is selected from a plurality of software programs stored in a memory in the portable telephone set.

20. The portable telephone set according to claim 19, further comprising a receive processing unit, wherein the plurality of software programs are stored in a software source memory, one of the plurality of software programs is selected and down-loaded and an operation of the receive processing unit is defined by the down-loaded software program.

21. The portable telephone set according to claim 18, further comprising a receive function unit comprising a received signal mixing portion, a demodulating portion and a base band signal processing portion, wherein an operation of said received signal mixing portion, said demodulating portion and said base band signal processing portion in the receive function unit is determined on the basis of the predetermined software program.

22. The portable telephone set according to claim 18, wherein said transmission function unit comprises one of a plurality of transmission function units each performing a different frequency band operation.

23. The portable telephone set according to claim 18, wherein the transmission function unit comprises one of an amplifier, a transmission signal filter and an isolator.

24. The portable telephone set according to claim 18, wherein the transmission function unit comprises a software memory for storing one of a plurality of software programs each adapted to each transmission function unit, the predetermined software program being defined by loading the software program from the software memory in the mounted transmission function unit.

25. The portable telephone set according to claim 18, further comprising a receipt function unit, wherein a currently operating system is detected on the basis of a demodulated output of a received signal in the receipt function unit and the detected system is displayed.

26. The portable telephone set of claim 18, wherein said detachable transmitting function part conditions the transmission frequency signal received from said transmitting circuit based upon a transmission system that corresponds to said detachable transmitting function part.

27. The portable telephone set of claim 18, wherein said transmitting circuit comprises a wide-band transmitting circuit.

* * * * *